(12) United States Patent
Eder et al.

(10) Patent No.: US 9,365,906 B2
(45) Date of Patent: Jun. 14, 2016

(54) PROCESS AND DEVICE FOR CHARGING INTO A SMELTING UNIT

(71) Applicant: SIEMENS VAI METALS TECHNOLOGIES GMBH, Linz (AT)

(72) Inventors: Thomas Eder, Traun (AT); Robert Millner, Loosdorf (AT); Jan Friedemann Plaul, Linz (AT); Norbert Rein, Vienna (AT); Andreas Scherney, Hörsching (AT); Karl Zehetbauer, Feldkirchen (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 107 days.

(21) Appl. No.: 14/198,697

(22) Filed: Mar. 6, 2014

(65) Prior Publication Data

US 2014/0196571 A1   Jul. 17, 2014

Related U.S. Application Data

(62) Division of application No. 13/502,282, filed as application No. PCT/EP2010/064867 on Oct. 6, 2010, now Pat. No. 8,728,384.

(30) Foreign Application Priority Data

Oct. 16, 2009   (AT) ................ A 1636/2009

(51) Int. Cl.
*C21B 13/00* (2006.01)
*C21B 13/14* (2006.01)
(Continued)

(52) U.S. Cl.
CPC .............. *C21B 3/00* (2013.01); *C21B 13/0093* (2013.01); *C21B 13/143* (2013.01); *F27D 3/0025* (2013.01); *C21B 2100/04* (2013.01); *Y02P 10/136* (2015.11)

(58) Field of Classification Search
CPC ....... C21B 13/0093; C21B 13/143; C21B 3/00
See application file for complete search history.

(56) References Cited

U.S. PATENT DOCUMENTS

| 4,946,498 | A  | 8/1990  | Weber   | 75/26  |
| 6,645,269 | B2 | 11/2003 | Zirngast | 75/446 |
| 7,776,136 | B2 | 8/2010  | Lee     | 75/770 |

(Continued)

FOREIGN PATENT DOCUMENTS

| CN | 1067453 A | 12/1992 |
| CN | 1195876 C | 4/2005  |

(Continued)

OTHER PUBLICATIONS

Tateishi et al. Japanese Patent 2009243708 A published Oct. 2009. Machine translation of the detailed description.*

(Continued)

*Primary Examiner* — George Wyszomierski
*Assistant Examiner* — Tima M McGuthry Banks
(74) *Attorney, Agent, or Firm* — Ostrolenk Faber LLP

(57) ABSTRACT

A process and a device for charging a primary product for pig iron into a smelting unit are provided. According to the process and device, some of the primary product that has been formed by reducing oxidic iron carriers is stored in the hot state in a reservoir tank before being supplied into the storage device or charging device that is directly connected to the smelting unit.

12 Claims, 1 Drawing Sheet

(51) Int. Cl.
*C21B 3/00* (2006.01)
*F27D 3/00* (2006.01)

(56) References Cited

U.S. PATENT DOCUMENTS

| | | | |
|---|---|---|---|
| 2003/0041690 A1 | 3/2003 | Zirngast | 75/446 |
| 2006/0162499 A1* | 7/2006 | Lee et al. | 75/560 |
| 2007/0216072 A1 | 9/2007 | Lee et al. | 266/137 |
| 2007/0272058 A1 | 11/2007 | Orth et al. | 75/502 |
| 2011/0094337 A1 | 4/2011 | Garza-Rodriguez et al. | 75/10.66 |
| 2011/0138965 A1 | 6/2011 | Boehm et al. | 75/505 |

FOREIGN PATENT DOCUMENTS

| | | |
|---|---|---|
| CN | 1751132 A | 3/2006 |
| EP | 0515744 A1 | 12/1992 |
| EP | 0 364 865 B1 | 9/1993 |
| JP | 02-156009 | 6/1990 |
| JP | 03-229812 | 10/1991 |
| JP | 2000-129323 | 5/2000 |
| JP | 2003-531963 | 10/2003 |
| JP | 2006-511706 | 4/2006 |
| JP | 2009243708 A * | 10/2009 |
| RU | 2311464 C2 | 11/2007 |
| UA | 73768 C2 | 1/2003 |
| WO | WO 2005/054250 A1 | 6/2005 |
| WO | 2006/011774 A1 | 2/2006 |
| WO | 2009/146982 A1 | 12/2009 |

OTHER PUBLICATIONS

English translation of Chinese Office Action dated Nov. 6, 2013 issued in corresponding Chinese Patent Application No. 201080046646.3 (10 pages).
Derwent Acc No. 2003-285806 for patent family including KR 2002049590 A by Choi et al published Jun. 26, 2002.
Machine Translation of KR 2002049590 A published Jun. 26, 2002.
International Preliminary Report on Patentability and Written Opinion dated Jan. 30, 2012 issued in PCT/EP2010/064867.

\* cited by examiner

PROCESS AND DEVICE FOR CHARGING INTO A SMELTING UNIT

CROSS-REFERENCE TO RELATED APPLICATIONS

This application is a divisional of U.S. Pat. No. 8,728,384, issued May 20, 2014 (U.S. patent application Ser. No. 13/502,282, filed Jul. 25, 2012), which is a national phase conversion of PCT/EP2010/064867, filed Oct. 6, 2010, which claims priority of Austrian Application No. A1636/2009, filed Oct. 16, 2009, the contents of which are incorporated herein by reference. The PCT International Application was published in the German language.

TECHNICAL FIELD

The present disclosure relates to a process and to a device for charging a primary product for pig iron into a smelting unit.

BACKGROUND

In certain reduction processes for finely particulate iron ore, for example the FINEX® process, direct reduced iron (DRI) is produced in fluidized-bed reactors by means of a reducing gas. This direct reduced iron has a degree of reduction of about 50-95%, depending on the operational method, and is finely particulate in common with the iron ore used. For complete reduction and to produce pig iron, the direct reduced iron DRI is supplied, after a compacting step in which so-called hot compacted iron (HCI) is obtained, to a storage device or charging device, through which a reducing gas possibly flows, and from there to a smelting unit, for example a melter gasifier. A storage device, also called an HCI bin, or charging device fulfills, inter alia, a buffer function for ensuring that hot compacted iron is charged continuously into the smelting unit. Furthermore, it makes it possible to preheat materials which are additionally to be charged into the smelting unit, for example pellets or lump ore or coke, by the reducing gas. In this case, the storage device is arranged above the smelting unit in order to make charging from the storage device into the smelting unit in the direction of the force of gravity possible.

During normal operation of a FINEX® installation, after the compacting the predominant part of the hot compacted iron obtained in the compacting step is supplied directly in the hot state to the storage device or charging device.

During normal operation of a FINEX® installation, after the compacting another part of the hot compacted iron obtained in the compacting step is utilized in order to provide a reservoir of compacted iron stored outside the storage device or charging device. This reservoir of compacted iron is typically required, for example, during the start-up or shut-down of a FINEX® installation. In conventional systems, the hot compacted iron which is not conveyed directly into the storage device is typically cooled very quickly in a quench tank with water and then stored in the open under atmospheric conditions. As soon as this cooled, stored compacted iron may be required for addition into the smelting unit, it is supplied to the storage device or charging device. It is preheated in the latter before being charged into the smelting unit.

It may be disadvantageous in this case that the compacted iron cooled in quench tanks tends toward reoxidation upon storage, and that a high input of energy is required to preheat said compacted iron before it is charged into the smelting unit. The time required for preheating the material may additionally increase the duration of the start-up process. Furthermore, the operation of the quenching apparatuses is often complex and necessitates time-consuming and expensive handling and disposal of cold briquetted iron and slurry. The installation parts involved may require costly maintenance and operation.

The same conditions also apply of course if, instead of a FINEX® process with HCI as the primary product, use is made of a process in which hot briquetted iron (HBI) is produced as the—briquetted, i.e. compacted—primary product from oxidic iron carriers.

In the case of non-compacted primary products, too, for example low reduced iron (LRI), it is accordingly disadvantageous not to store the primary product in the hot state.

SUMMARY

In one embodiment, a process is provided for producing pig iron in a smelting unit from a primary product which has been obtained by reducing oxidic iron carriers by means of a first reducing gas, wherein the primary product is supplied to a storage device or charging device which is directly connected to the smelting unit and from which addition into the smelting unit takes place, wherein some of the primary product is stored in the hot state in a reservoir tank before being supplied into the storage device or charging device which is directly connected to the smelting unit.

In a further embodiment, the oxidic iron carriers are finely particulate iron ore. In a further embodiment, the oxidic iron carriers are lump ore or pellets. In a further embodiment, the primary product is hot compacted iron HCI. In a further embodiment, the primary product is hot briquetted iron HBI. In a further embodiment, the primary product is hot low reduced iron LRI. In a further embodiment, a reoxidation protective gas which inhibits reoxidation of the primary product is flushed around the primary product stored in the hot state in the reservoir tank. In a further embodiment, a second reducing gas flows through the storage device or charging device which is directly connected to the smelting unit. In a further embodiment, the first reducing gas and the second reducing gas originate from the same source. In a further embodiment, the addition from the storage device or charging device into the smelting unit takes place substantially according to the force of gravity.

In another embodiment, a device is provided for carrying out any of the processes discussed above, comprising at least one reduction unit for reducing oxidic iron carriers by means of a first reducing gas, a first reducing gas line which issues into the reduction unit, a smelting unit for producing pig iron from the primary product which has been obtained during the reduction of oxidic iron carriers by means of the first reducing gas, and a supply device for supplying primary product into a storage device or charging device which is connected to the smelting unit via at least one addition line, wherein the addition line issues into the smelting unit by way of an addition opening, and wherein a feeding device for feeding primary product to the supply device is present, wherein a reservoir tank for storing primary product in the hot state is present, as too is an introduction device for introducing primary product into the reservoir tank, wherein the reservoir tank is also connected to the supply device.

In a further embodiment, a compacting device for compaction and/or briquetting is present, wherein the compacting device is located between the reduction unit and the supply device and between the reduction unit and the introduction device. In a further embodiment, a feeding device for feeding compacted and/or briquetted primary product from the compacting device to the supply device is present, and in that the reservoir tank is connected to the compacting device via an introduction device for introducing compacted and/or briquetted primary product from the compacting device into the reservoir tank 14. The device as claimed in either of claims 11 and 12, wherein a second reducing gas line issues into the storage device or charging device.

In a further embodiment, the first reducing gas line and the second reducing gas line are connected to a unit for producing reducing gas, wherein the first reducing gas line and the second reducing gas line are connected to the same unit for producing reducing gas. In a further embodiment, a reoxidation protective gas line for supplying reoxidation protective gas issues into the reservoir tank. In a further embodiment, the reservoir tank is arranged at a lower height than the addition opening into the smelting unit. In a further embodiment, the smelting unit is a melter gasifier. In a further embodiment, the reduction unit is a fixed-bed reactor or a fluidized-bed reactor.

BRIEF DESCRIPTION OF THE DRAWINGS

Example embodiments will be explained in more detail below with reference to figures, in which.

DETAILED DESCRIPTION

Figure 1:
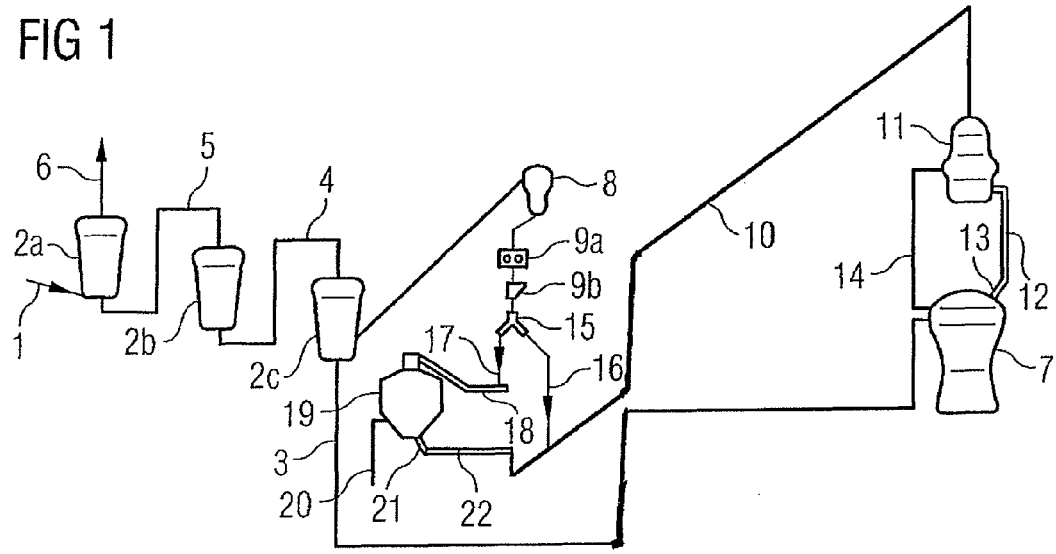
FIG. 1 shows a schematic structure of a device according to an example embodiment with fluidized-bed reactors.

Some embodiments disclosed herein provide a process and a device for producing pig iron from a primary product in which said disadvantages are avoided.

For example, one embodiment provides a process for producing pig iron in a smelting unit from a primary product which has been obtained by reducing oxidic iron carriers by means of a first reducing gas, wherein the primary product is supplied to a storage device or charging device which is directly connected to the smelting unit and from which addition into the smelting unit takes place, characterized in that some of the primary product is stored in the hot state in a reservoir tank before being supplied into the storage device or charging device which is directly connected to the smelting unit.

The oxidic iron carriers are converted into a primary product for producing pig iron, for example direct reduced iron DRI, by reduction by means of a first reducing gas. If the product of the reduction is not lumpy, but rather finely particulate, the manageability can be improved by subjecting it to compaction by means of compacting devices, which comprise compacting machines and crusher systems. Some of the primary product is stored in a reservoir tank before being supplied into a storage device or charging device which is directly connected to the smelting unit for producing pig iron. In this case, the iron primary product is not cooled by quenching, but instead is stored in the hot state in the reservoir tank. If compaction takes place, the primary product is stored in the reservoir tank after compaction has been effected.

In this way, no time-consuming preheating of this material is necessary in the event of charging into the smelting unit. The primary product stored in the reservoir tank can be added into the storage device or charging device during a start-up process. This can also be effected during normal operation, in order to compensate for fluctuations in quantity during the production of the primary product by the addition of primary product to the storage device or charging device.

The storage device and charging device are to be considered equivalent, since both devices are suitable for receiving delivered primary product before addition into the smelting unit, or before addition into the smelting unit delivered material lingers for a period of time in a charging device before it enters into the smelting unit, since passage through the charging device requires a certain amount of time. During this time, the material is therefore located in the charging device and is thus stored therein.

According to different embodiments of the process, the oxidic iron carriers are finely particulate iron ore, or they are lump ore or pellets.

According to one embodiment of the process, the primary product is hot compacted iron. Reference is typically made, for example, to hot compacted iron HCI if the density of the primary product is less than/equal to 4.5 kg/dm.sup.3, and the metallization is <88%. HCI possibly contains additions.

According to one embodiment of the process, the primary product is hot briquetted iron HBI. Reference is typically made, for example, to hot briquetted iron if the density of the primary product is greater than/equal to 5 kg/dm.sup.3, and the metallization thereof is greater than/equal to 88%. HBI typically contains no additions.

According to one embodiment of the process, the primary product is hot low reduced iron.

It may be preferable for a reoxidation protective gas which inhibits reoxidation of the primary product to be flushed around the primary product stored in the hot state in the reservoir tank. It may thereby be possible to prevent reoxidation, in the worst case marked as a fire, during storage in the reservoir tank. A suitable reoxidation protective gas is, for example, an inert gas such as nitrogen or a reducing gas—this reducing gas may be for example the first reducing gas or the second reducing gas, which is also introduced hereinbelow.

Accordingly, the risk to safety when carrying out the process according to certain embodiments is reduced compared to conventional systems. The non-oxidizing, i.e., for example inert or reducing, atmosphere within the reservoir tank prevents the reoxidation of the primary product and reduces the negative effects on the smelting unit as a result of the use of primary product with a low or greatly fluctuating degree of reduction.

According to one embodiment of the process, a second reducing gas flows through the storage device or charging device which is directly connected to the smelting unit.

According to a particular embodiment, the first reducing gas and the second reducing gas originate from the same source, for example the smelting unit, i.e. a melter gasifier. In this way, the number of installations required for providing reducing gases may be reduced.

It may be preferable for the addition from the storage device or charging device into the smelting unit to take place substantially according to the force of gravity. The expenditure in terms of apparatus and energy for conveying the primary product from the storage device or charging device into the melter gasifier is thereby kept small. In principle, however, the addition can also be effected counter to the force of gravity, i.e., for example in such a manner that the storage device or charging device is located beneath an opening for the addition of primary product into the smelting unit, and the primary product has to be conveyed from there upward, i.e. counter to the force of gravity, to the addition opening. Similarly, the addition opening and the storage device or charging device can be located to the side of one another at one height, in which case the primary product has to be conveyed out of the storage device or charging device sideways to the addition opening, i.e., not in the direction of the force of gravity. More energy and more expenditure in terms of apparatus are required for sideways or upward conveying than for an addition which is effected substantially according to the force of gravity, i.e., downward. In this case, the term "substantially" means that, in addition to a downward movement, the addition may also involve a sideways movement of the added material, for example if the opening from which the primary product leaves the storage device or charging device does not lie vertically above the addition opening through which it is added into the smelting unit.

Some embodiments further relate to a device for carrying out any of the processes disclose herein, which device may include at least one reduction unit for reducing oxidic iron carriers by means of a first reducing gas, a first reducing gas line which issues into the reduction unit, a smelting unit for producing pig iron from the primary product which has been obtained during the reduction of oxidic iron carriers by means of the first reducing gas, and a supply device for supplying primary product into a storage device or charging device which is connected to the smelting unit via at least one addition line, wherein the addition line issues into the smelting unit by way of an addition opening, and wherein a feeding device for feeding primary product to the supply device is present, characterized in that a reservoir tank for storing primary product in the hot state is present, as too is an introduction device for introducing primary product into the reservoir tank, wherein the reservoir tank is also connected to the supply device.

The oxidic iron carriers are reduced by means of a first reducing gas in at least one reduction unit, which for example can be in the form of a fluidized-bed reactor or a fixed-bed reduction shaft. The first reducing gas used for reduction is supplied by means of a first reducing gas line which issues into the reduction unit.

The addition line, which issues into the smelting unit by way of an addition opening, may also be part of the charging device.

The reduction unit can be, for example, a fixed-bed reactor or a fluidized-bed reactor.

The primary product which has been obtained during the reduction of oxidic iron carriers and is possibly compacted or briquetted is fed to a supply device for supplying primary product by means of a feeding device. The feeding device may be, for example, a chute, a screw conveyor, a conveyor channel or a pipe. By means of the supply device for supplying primary product, for example a hot conveyor, the primary product is transported into a storage device or charging device.

The storage device or charging device is connected to the smelting unit via an addition line, through which primary product from the storage device or charging device is added directly into the smelting unit. It goes without saying that additional devices can be present in the addition line, for example valves or lock devices. The addition line issues into the smelting unit by way of an addition opening, through which material originating from the storage device enters the smelting unit.

Furthermore, the device according to certain embodiments has a reservoir tank for storing primary product in the hot state.

Said reservoir tank is connected both to an introduction device for introducing primary product into the reservoir tank and to the supply device. The introduction device is, for example, a down pipe, a chute, a hot conveyor, a screw conveyor or a star feeder. Primary product can therefore be introduced into the reservoir tank and fed from the reservoir tank—for example via a screw conveyor, a star feeder, an intermediate hot conveyor, a valve, a pipe or a chute—to the supply device.

The reservoir tank is lined with refractory material. The storage capacity thereof should advantageously cover the demand for primary product, for example hot compacted iron HCI, for operation of the device for about 12-24 hours to about two days for carrying out the process according to certain embodiments. By way of example, a demand for 4600 t HCI would correspond to a reservoir tank volume of about 2.times.900 m.sup.3.

According to one embodiment, a compacting device for compaction and/or briquetting is present, wherein the compacting device is located between the reduction unit and the supply device and between the reduction unit and the introduction device. In this case, the compacting device is connected in each case to the two device parts between which it is located. In this context, "between" is to be understood in respect of the flow of material from the reduction unit to the smelting unit. The material taken from the reduction unit, for example DRI, is compacted in the compacting device, which comprises compacting machines and crusher systems. In this case, hot compacted iron HCI or hot briquetted iron HBI is formed, for example, as the primary product.

In this case, it may be preferable for a feeding device for feeding compacted and/or briquetted primary product from the compacting device to the supply device to be present, and for the reservoir tank to be connected to the compacting device via an introduction device for introducing compacted and/or briquetted primary product from the compacting device into the reservoir tank.

According to one embodiment, a second reducing gas line issues into the storage device or charging device. By coming into contact with the second reducing gas which is fed in through this reducing gas line, material located in the storage device or charging device is possibly partially reduced or heated. In this case, the first reducing gas line and the second reducing gas line are connected to a unit for producing reducing gas, where according to one embodiment the first reducing gas line and the second reducing gas line are connected to the same unit for producing reducing gas. A unit for producing reducing gas is to be considered a source for reducing gas.

It may be preferable for a reoxidation protective gas line for supplying reoxidation protective gas to issue into the reservoir tank. The hot primary product, for example hot compacted iron HCI, located in the reservoir tank can thereby be protected against reoxidation.

According to one embodiment, the reservoir tank is arranged at a lower height, for example level with the ground, than the addition opening into the smelting unit. This leads to savings in production material and steel structures when constructing the reservoir tank or when constructing supporting structures for the reservoir tank.

According to one embodiment, the smelting unit is a melter gasifier. It can also be a blast furnace.

Compared to the quenching of primary product, for example HCI, before storage, as carried out according to conventional systems, certain embodiments of the invention have the advantage that no wet quenched primary product, for example HCI, is mixed with hot primary product, for example HCI, thereby reducing the risk of explosion as a result of the formation of hydrogen. Furthermore, the design according to certain embodiments may eliminate the need to acquire and operate a quench tank for cooling primary product. The amount of process water required can therefore be reduced.

A further advantage of certain embodiments is that a storage device or charging device, for example an HCI bin, can have a smaller design, since material for compensating for fluctuations in the production of primary product does not have to be present in the HCI bin, but instead can be taken from the reservoir tank. The expenditure for materials and work for the construction of the HCI bin and also the overall height thereof may therefore be reduced.

It may be preferable for at least two reservoir tanks to be present so that it is possible to use a redundant tank during maintenance work.

Primary product from the reservoir tank can also be supplied to a plurality of different smelting units, for example a melter gasifier and a blast furnace.

Referring to the example system of FIG. 1, finely particulate iron ore 1 is introduced into a cascade of fluidized-bed reactors 2a, 2b, 2c. A first reducing gas is introduced via the first reducing gas line 3 into the fluidized-bed reactor 2c, after leaving the latter is guided via a connection line 4 into the fluidized-bed reactor 2b, after leaving the latter is guided via a connection line 5 into the fluidized-bed reactor 2a, and is removed from the latter via a top gas line 6. The first reducing gas line 3 emanates from the melter gasifier 7, in which pig iron is produced from hot compacted iron. Product taken from the fluidized-bed reactor 2c is compacted to form hot compacted iron by means of a compacting device, which comprises an intermediate tank 8, a compacting machine 9a and a crusher system 9b. The hot compacted iron is supplied to a storage device 11, the HCI bin, via a supply device 10. The HCI bin is arranged above the melter gasifier 7. The storage device 11 is connected to the melter gasifier 7 via an addition line 12, via which hot compacted iron HCI is added from the storage device 11 into the melter gasifier 7 according to the force of gravity. The addition line 12 issues into the melter gasifier 7 by way of an addition opening 13. A second reducing gas line 14, emanating from the melter gasifier 7, issues into the storage device 11.

Hot compacted iron is directly fed from the crusher system 9b by means of a feeding device, which is represented in the figure by means of a line 16 proceeding from a chute 15. If the chute 15 is set accordingly, hot compacted iron produced in the compacting device can be introduced directly into the reservoir tank 19 via an introduction device, which is represented by a line 17 and a hot conveyor 18. The inert gas nitrogen is conducted into the reservoir tank 19 via a reoxidation protective gas line 20 which issues into the reservoir tank 19. The reservoir tank 19 is connected to the supply device 10 via the reservoir outlet line 21 and the hot conveyor 22. Therefore, hot compacted iron can be taken from the reservoir tank 19 and supplied to the storage device 11 as required.

Figure 2:
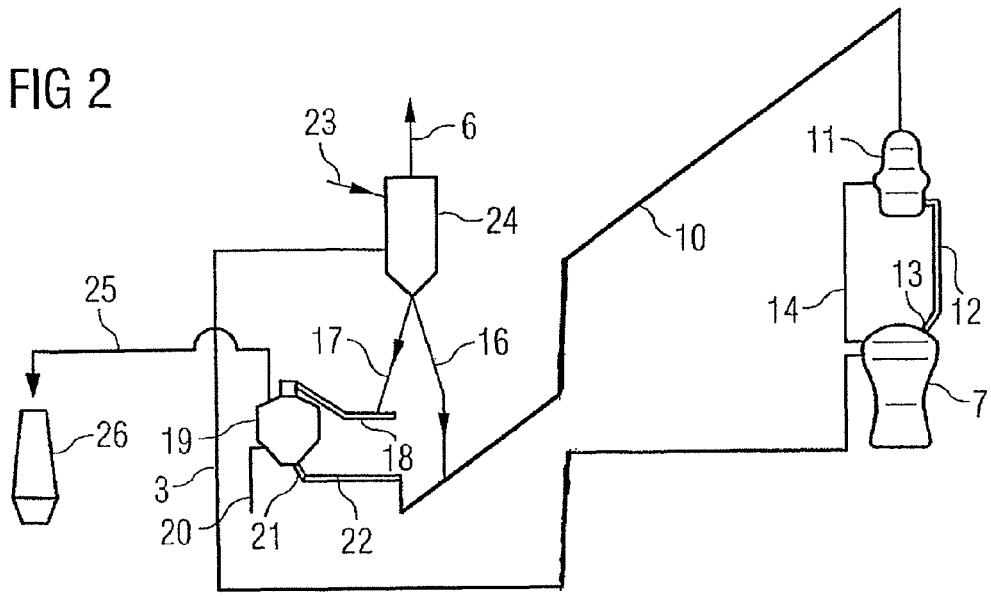
FIG. 2 shows a schematic structure of a device according to an example embodiment with a fixed-bed reactor.

In FIG. 2, device parts corresponding to those in FIG. 1 are provided with the same reference symbols as in FIG. 1.

FIG. 2 differs from FIG. 1 in that, instead of fluidized-bed reactors, use is made of a fixed-bed reactor 24 as the reduction unit. Lump ore and pellets are introduced as oxidic iron carriers 23 into said fixed-bed reactor. The fixed-bed reactor is connected to the first reducing gas line 3, through which first reducing gas flows in. Consumed reducing gas is removed via the top gas line 6. Primary product is supplied from the fixed-bed reactor 24 either via the line 16 to the supply device 10 or via the line 17 to the hot conveyor 18, via which the hot primary product is conveyed into the reservoir tank 19. Primary product can be supplied from the reservoir tank 19 via the export line 25 to a blast furnace 26.

LIST OF ELEMENTS REFERENCED IN THE DRAWINGS

1 Finely particulate iron ore
2a, 2b, 2c Fluidized-bed reactors
3 First reducing gas line
4 Connection line
5 Connection line
6 Top gas line
7 Melter gasifier
8 Intermediate tank
9a Compacting machine
9b Crusher system
10 Supply device
11 Storage device
12 Addition line
13 Addition opening
14 Second reducing gas line
15 Chute
16 Line
17 Line
18 Hot conveyor
19 Reservoir tank
20 Reoxidation protective gas line
21 Reservoir outlet line
22 Hot conveyor
23 Oxidic iron carriers
24 Fixed-bed reactor
25 Export line
26 Blast furnace

What is claimed is:

1. A process for producing pig iron in a smelting unit, comprising:
   producing a primary product by reducing oxidic iron carriers using a first reducing gas and compacting the reduced iron carriers;
   transferring, without quenching, to a reservoir tank an amount of the primary product after compacting;
   storing the amount of the primary product in the reservoir tank after the compacting; and
   supplying the primary product, including the amount stored in the reservoir tank, to a storage device which is directly connected to the smelting unit; and
   adding the primary product from the storage device or charging device into the smelting unit.

2. The process of claim 1, wherein the oxidic iron carriers are particulate iron ore.

3. The process of claim 1, wherein the oxidic iron carriers are lump ore or pellets.

4. The process of claim 1, wherein the primary product is hot compacted iron (HCI).

5. The process of claim 1, wherein the primary product is hot briquetted iron (HBI).

6. The process of claim 1, wherein the primary product is partially reduced iron LRI.

7. The process of claim 1, further comprising flushing a reoxidation protective gas which inhibits reoxidation of the primary product around the primary product stored in the hot state in the reservoir tank.

8. The process of claim 1, wherein a second reducing gas flows through the storage device which is directly connected to the smelting unit.

9. The process as claimed in claim 8, wherein the first reducing gas and the second reducing gas originate from the same source.

10. The process of claim 1, wherein the addition from the storage device into the smelting unit takes place substantially according to the force of gravity.

11. A process for producing pig iron in a smelting unit from a primary product which has been obtained by reducing oxidic iron carriers using a first reducing gas, comprising:

storing an amount of the primary product in a reservoir tank; and supplying the primary product, including the amount stored in the reservoir tank, to a storage device or charging device which is directly connected to the smelting unit; and adding the primary product from the storage device or charging device into the smelting unit, wherein a second reducing gas flows through the storage device or charging device which is directly connected to the smelting unit.

12. The process as claimed in claim 11, wherein the first reducing gas and the second reducing gas originate from the same source.

* * * * *